United States Patent [19]

Barker et al.

[11] 3,919,190

[45] Nov. 11, 1975

[54] WATER INSOLUBLE ANTIBIOTIC METAL CELLULOSE COMPOUNDS AND PROCESS OF PREPARATION

[75] Inventors: Sidney Alan Barker; John Frederick Kennedy, both of Birmingham, England

[73] Assignee: Ranks Hovis McDougall Limited, London, England

[22] Filed: Apr. 27, 1973

[21] Appl. No.: 354,958

[30] Foreign Application Priority Data
May 3, 1972 United Kingdom............... 20617/72

[52] U.S. Cl. 260/210 AB; 260/210 K; 260/210 NE; 260/210 S; 260/212 R; 424/180
[51] Int. Cl.²........................................ C07H 15/22
[58] Field of Search... 260/209 R, 210 AB, 210 NE, 260/210 K, 212 R, 210 S

[56] References Cited
UNITED STATES PATENTS

| | | | |
|---|---|---|---|
| 2,489,651 | 11/1949 | Langkammerer................... | 260/212 |
| 2,562,955 | 8/1951 | Schuyten et al..................... | 260/212 |
| 2,702,228 | 2/1955 | Kahler et al........................ | 260/212 |
| 2,811,481 | 10/1957 | Chornock....................... | 260/210 NE |
| 2,830,011 | 4/1958 | Parker et al.................. | 260/210 NE |
| 2,931,798 | 4/1960 | Umezawa et al................ | 260/210 K |
| 3,074,927 | 1/1963 | Saltman et al.................. | 260/209 R |
| 3,563,978 | 2/1971 | Ochs............................... | 260/209 R |
| 3,607,864 | 9/1971 | Halpern......................... | 260/210 NE |
| 3,691,151 | 9/1972 | Guadagnini et al............. | 260/210 K |

*Primary Examiner*—Johnnie R. Brown
*Attorney, Agent, or Firm*—Stevens, Davis, Miller & Mosher

[57] ABSTRACT

A process for the preparation of a water insoluble antibiotic which process comprises reacting at pH 3 to 7 an antibiotic exhibiting antibacterial activity with a titanium, tin, zirconium, iron or vanadium derivative of cellulose or a derivative thereof.

The antibiotic may be streptomycin, paromomycin, gentamycin, kanamycin, neomycin, polymyxin, ampicillin or natamycin.

12 Claims, No Drawings

WATER INSOLUBLE ANTIBIOTIC METAL CELLULOSE COMPOUNDS AND PROCESS OF PREPARATION

This invention is for improvements in or relating to antibiotics and has particular reference to the modification of antibiotics by attachment to water insoluble solid matrices, i.e. cellulose or a derivative thereof.

More particularly this invention relates to methods for the water insolubilization of antibiotics exhibiting antibacterial activity by attachment to certain derivatives of cellulose in such a way that the insolubilized antibiotics retain part of the spectrum of biological activity normally exhibited by them in solution. They thereby afford protection to the cellulose derivatives against attack by those particular micro-organisms. Such insolubilized antibiotics have applications in providing selective protection against microbial attack on paper and legal documents, canvas, chromatographic fillings of columns where these are based on cellulose derivatives, insolubilized enzyme reactors based on attachment of the enzyme to cellulose derivatives, protection of certain cellulose based packings for cooling towers and wall papers based on cellulose. They also provide a novel form of sterility for sheets and other cotton based fabrics and gauze and can be useful as wound dressings particularly for burns prone to infection by *Pseudomonas aeruginosa* or for treating infected root canals in teeth prior to root filling.

Antibiotics are well known to exhibit antimicrobial activity in solution even at low concentrations. Although it is difficult to predict prior to their preparation and testing, it has also been established that a limited number of derivatives of antibiotics are also biologically active in solution. What is unexpected is that certain antibiotic preparations rendered insoluble by attachment to cellulose still exhibit part, but in general not all, of the normal antimicrobial activity of the original soluble antibiotic even when the said preparations have been extensively washed with water and strong salt solutions. A limited number of insoluble antibiotic preparations have been provided which inhibit the growth of all four organisms under test namely *Streptococcus faecalis*, *Staphylococcus pyogenes*, *Escherichia coli*, and *Pseudomonas aeruginosa*.

A method has been devised for antibiotic insolubilization based on a technique in which a titanium, tin, zirconium, iron or vanadium derivative of cellulose is chemically coupled to an antibiotic.

The invention provides antibiotics attached to water insoluble solid matrices.

It is a particular object of this invention to provide active water-insoluble preparations of antibiotics exhibiting antibacterial activity chemically coupled with organo-metallic derivatives of cellulose or a derivative thereof.

The present invention provides water insoluble derivatives of streptomycin, paromomycin, gentamycin, kanamycin, neomycin, polymyxin, ampicillin and natamycin chemically coupled to titanium, tin, zirconium, iron or vanadium derivatives of cellulose or a derivative thereof.

According to the present invention there is also provided a process for the preparation of a water insoluble antibiotic which process comprises reacting at pH 3 to 7 an antibiotic exhibiting antibacterial activity with a titanium, tin, zirconium, iron or vanadium derivative of cellulose or a derivative thereof.

The organo-metallic derivative of cellulose or a derivative thereof may be obtained by reaction of the cellulose or a derivative thereof with a salt or other derivative of titanium, tin, zirconium, iron or vanadium that gives a suitable organo-metallic derivative.

The reaction may be carried out at a pH of 4.5 for 1 hour at 4°C.

The antibiotic exhibiting antibacterial activity preferably contains at least one amino group; normally one or more primary amino groups is present.

Antibacterial bioassays were employed to assess the effectiveness of the preparations. Since the samples of the antibiotics attached to cellulose were water-insoluble, a modification of the usual method of stepwise dilution was adopted. In addition, a constant weight (15 mg) of the sample was tested each time in order to provide results which allowed comparisons to be drawn.

Each antibiotic is optimally coupled via a particular metal derivative of cellulose to obtain maximum antimicrobial activity.

Thus from the results given in Tables 1 to 5 the following antibiotics exhibit a decreasing order of antibacterial activity from the first mentioned metal salt used for coupling to cellulose to the last in each series.

Streptomycin: $SnCl_4 > ZrCl_4 > TiCl_3 > VCl_3 > FeCl_3$
Paromomycin: $SnCl_4 > FeCl_3 > ZrCl_4 > TiCl_3 > UCl_3$
Gentamycin: $SnCl_4 \quad ZrCl_4 > TiCl_3 > FeCl_3 > VCl_3$
Kanamycin: $SnCl_4 \quad ZrCl_4 > FeCl_3 \quad TiCl_3 > VCl_3$
Neomycin: $ZrCl_4 \quad SnCl_4 > FeCl_3 \quad VCl_3 > TiCl_3$
Polymyxin: $FeCl_3 \quad VCl_3 > SnCl_4 = ZrCl_4 = TiCl_3$
Ampicillin: $SnCl_4 > FeCl_3 > VCl_3 > TiCl_3 > ZrCl_4$
Natamycin: $SnCl_4 > VCl_3 > FeCl_3 > ZrCl_4$ or $TiCl_3$ These orders of antibacterial activity were assessed from their action against two gram positive and two gram negative bacteria. The above orders of activity, therefore give the preferred methods by which the antibiotic is coupled to cellulose. Where two methods of coupling are apparently equally effective, the least toxic and cheapest metal is the method preferred. For particular uses, other factors such as its ability to inhibit the growth of *Pseudomonas aeruginosa* in a burns dressing are decisive. In particular the following were effective against all four test organisms.

Streptomycin — tin — cellulose derivative
Streptomycin — zirconium — cellulose derivative
Paromomycin — tin — cellulose derivative
Gentamycin — tin — cellulose derivative
Gentamycin — titanium — cellulose derivative
— zirconium — cellulose derivative
Kanamycin — tin — cellulose derivative
Kanamycin — zirconium — cellulose derivative
Neomycin — zirconium — cellulose derivative
Neomycin — tin — cellulose derivative
Natamycin — tin — cellulose derivative Following is a description by way of example of methods of carrying the invention into effect. *General Information and Procedures of Testing Sources of Antibiotics.* Streptomycin sulphate (Glaxo Laboratories Ltd.), neomycin sulphate (Boots Pure Drug Co. Ltd.), kanamycin sulphate (Bayer), paromomycin sulphate (Parke-Davis Ltd.), gentamycin sulphate (Aspro-Nicholas Ltd.), ampicillin (Beecham Research Lab.), polymyxin B sulphate (Burrough Wellcome and Co.) and natamycin (Arthur H. Cox and Co. Ltd.).

Bioassay methods. (a) Anti-bacterial assay. Antibacterial bioassay was performed using two gram positive (Streptococcus faecalis and Staphylococcus pyogenes) and two gram negative (Escherichia coli and Pseudomonas aeruginosa) bacteria as representative organisms. A circular nutrient agar plate (8.7 cm diameter) was freshly prepared from sterile, melted and cooled nutrient agar and a ditch (1.2 cm) cut out along the diameter of the plate. A suspension of the test material (15 mg) in the same agar was poured into the ditch and pure cultures of the four organisms were streaked across the ditch. The plate was then incubated at 37°C. for 24 hours. The extent of inhibition to growth of each organism was measured from the edge of the ditch. Control plates without the samples were set up at the same time to check the growth of the organisms. Standards of the pure antibiotics were similarly tested.

EXAMPLE 1

Microcrystalline cellulose ("Sigmacell", type 38; Sigma Chemical Company) (20 g.) was mechanically stirred with filtered titanous chloride (B.D.H., C 12.5% w/v, 200 ml). The solid was filtered off, and held for 24 hours in an oven at 45°C., ground to a powder and stored at room temperature in a desiccator over phosphorous pentoxide.

Samples of the resulting titanium derivative of cellulose (1500 mg.) were washed twice with 0.02M phosphate buffer pH 5.1. The samples were then magnetically stirred with a solution of antibiotic (100 mg.) in 0.1M sodium phosphate buffer pH 4.5 (30 ml.) for 1 hour at 4°C. The insoluble material was washed with five cycles of 0.1M sodium phosphate buffer pH 5.1 (30 ml.) followed by 0.5M sodium chloride in 0.1M sodium phosphate buffer pH 5.1 (30 ml.). The samples were then suspended in 0.1 M sodium phosphate buffer pH 5.1 (30 ml.) and dialyzed against running tap water overnight. The final volume of each suspension was adjusted to 30 ml. prior to testing. For results see Tables 1 and 2.

TABLE 1

Coupling of titanium derivative of cellulose with antibiotics

| Product from Titanium-cellulose and: | Escherichia coli | Inhibition to Streptococcus faecalis | Staphylococcus pyogenes | Pseudomonas aeruginosa |
|---|---|---|---|---|
| Streptomycin sulphate | 7mm from ditch | — | 5mm from ditch | 4mm from ditch |
| Paromomycin sulphate | 5mm from ditch | — | 5mm from ditch | — |
| Gentamycin sulphate | 5mm from ditch | across ditch | 5mm from ditch | across ditch |
| Kanamycin sulphate | 5mm from ditch | across ditch | 5mm from ditch | — |

TABLE 2

Coupling of titanium derivative of cellulose with antibiotics

| Product from Titanium-cellulose and: | Escherichia coli | Inhibition to Streptococcus faecalis | Staphylococcus pyogenes | Pseudomonas aeruginosa |
|---|---|---|---|---|
| Neomycin sulphate | — | across ditch | across ditch | — |
| Polymyxin sulphate | 2mm from ditch | — | — | across ditch |
| Ampicillin | — | — | growth diminished across ditch | — |

EXAMPLE 2

The procedure described in Example 1 was repeated using other metal salt solutions in place of titanous chloride. In this way iron, tin, zirconium and vanadium derivatives of cellulose were prepared using ferric chloride (A.R. grade, Hopkin and Williams Ltd., c, 12.5% w/v), stannic chloride (Hopkin and Williams Ltd., 12.5% w/v), zirconium tetrachloride (British Drug Houses Ltd., c, 12.5% w/v), and vanadium trichloride (British Drug Houses Ltd., c, 12.5% w/v) respectively.

Samples of each of the above mentioned derivatives of cellulose were contacted with solutions of antibiotic as described in Example 1 and submitted to the same procedure of washing prior to biological testing. For results see Tables 3, 4 and 5.

TABLE 3

Comparison of antibacterial activity of antibiotics coupled to Iron, Tin, Zirconium and Vanadium Cellulose

| Antibiotic coupled to cellulose | Method used | Escherichia coli | Inhibition to Streptococcus faecalis | Staphylococcus pyogenes | Pseudomonas aeruginosa |
|---|---|---|---|---|---|
| Streptomycin sulphate | FeCl₃ | — | across ditch | 5mm from ditch | — |
| | SnCl₄ | 15mm from ditch | 3mm from ditch | 15mm from ditch | 6mm from ditch |
| | ZrCl₄ | 12mm from ditch | across ditch | 12mm from ditch | across ditch |
| | VCl₃ | 7mm from ditch | — | 8mm from ditch | — |
| Paromomycin | FeCl₃ | 5mm from ditch | diminished across ditch | 7mm from ditch | across ditch |
| | SnCl₄ | 10mm from ditch | across ditch | 10mm from ditch | across ditch |
| | ZrCl₄ | 9mm from ditch | across ditch | 10mm from ditch | — |
| | VCl₃ | 4mm from ditch | — | 5mm from ditch | — |

TABLE 3

Comparison of antibacterial activity of antibiotics coupled to Iron, Tin, Zirconium and Vanadium Cellulose

| Antibiotic coupled to cellulose | Method used | Escherichia coli | Inhibition to Streptococcus faecalis | Staphylococcus pyogenes | Pseudomonas aeruginosa |
|---|---|---|---|---|---|
| Gentamycin | FeCl₃ | 7mm from ditch | — | 10mm from ditch | — |
| | SnCl₄ | 11m from ditch | 4mm from ditch | 12mm from ditch | 3mm from ditch |
| | ZrCl₄ | 10mm from ditch | 4mm | 14mm from ditch | 3mm from |

TABLE 3-continued

Comparison of antibacterial activity of antibiotics coupled to Iron, Tin, Zirconium and Vanadium Cellulose

| Antibiotic coupled to cellulose | Method used | Escherichia coli | Inhibition to Streptococcus faecalis | Staphylococcus pyogenes | Pseudomonas aeruginosa |
|---|---|---|---|---|---|
| | | ditch | from ditch | ditch | ditch |
| | VCl₃ | 3mm from ditch | diminished across ditch | 6mm from ditch | — |

TABLE 4

Comparison of antibacterial activity of antibiotics coupled to Iron, Tin, Zirconium and Vanadium Cellulose

| Antibiotic coupled to Cellulose | Method used | Escherichia coli | Inhibition to Streptococcus faecalis | Staphylococcus pyogenes | Pseudomonas aeruginosa |
|---|---|---|---|---|---|
| Kanamycin | FeCl₃ | 5mm from ditch | across ditch | 6mm from ditch | — |
| | SnCl₄ | 12mm from ditch | 2mm from ditch | 14mm from ditch | across ditch |
| | ZrCl₄ | 12mm from ditch | across ditch | 12mm from ditch | across ditch |
| | VCl₃ | across ditch | — | 4mm from ditch | — |
| Neomycin | FeCl₃ | 3mm from ditch | diminished across ditch | 3mm from ditch | diminished across ditch |
| | SnCl₄ | 3mm from ditch | across ditch | 4mm from ditch | across ditch |
| | ZrCl₄ | 5mm from ditch | across ditch | 4mm from ditch | across ditch |
| | VCl₃ | 3mm from ditch | diminished across ditch | 3mm from ditch | diminished across ditch |

TABLE 5

Comparison of antibacterial activity of antibiotics coupled to Iron, Tin, Zirconium and Vanadium Cellulose

| Antibiotic coupled to cellulose | Method used | Escherichia coli | Inhibition to Streptococcus faecalis | Staphylococcus pyogenes | Pseudomonas aeruginosa |
|---|---|---|---|---|---|
| Polymyxin | FeCl₃ | across ditch | — | across ditch | across ditch |
| | SnCl₄ | 3mm from ditch | — | — | across ditch |
| | ZrCl₄ | 2mm from ditch | — | — | across ditch |
| | VCl₃ | 1mm from ditch | across ditch | — | across ditch |
| Natamycin | FeCl₃ | across ditch | diminished across ditch | — | — |
| | SnCl₄ | across ditch | across ditch | across ditch | diminished across ditch |
| | ZrCl₄ | — | — | — | — |
| | VCl₃ | diminished across ditch | diminished across ditch | diminished across ditch | — |
| Ampicillin | FeCl₃ | across ditch | diminished across ditch | — | — |
| | SnCl₄ | diminished across ditch | diminished across ditch | diminished across ditch | diminished across ditch |
| | ZrCl₄ | — | — | — | — |
| | VCl₃ | diminished across ditch | diminished across ditch | — | — |

We claim:

1. A process for the preparation of an active water insoluble antibiotic comprising reacting at a pH between 3 and 7 an antibiotic exhibiting antibacterial activity containing at least one amino group selected from the group consisting of streptomycin, paromomycin, gentamycin, kanamycin, neomycin, polymyxin, ampicillin and natamycin with a metal derivative of cellulose, said metal being selected from the group consisting of titanium, tin, zirconium, iron and vanadium.

2. A process as claimed in claim 1 wherein said titanium, tin, zirconium, iron or vanadium derivative of cellulose is obtained by reaction of said cellulose with an aqueous solution of a metal salt selected from the group consisting of halides of titanium, tin, zirconium, iron or vanadium.

3. A process as claimed in claim 1 wherein the reaction is carried out at a pH of 4.5 for 1 hour at 4°C.

4. Active water-insoluble preparations of antibiotics exhibiting antibacterial activity containing at least one amino group selected from the group consisting of streptomycin, paromomycin, gentamycin, kanamycin, neomycin, polymyxin, ampicillin and natamycin chemically coupled to a titanate, zirconate, stannate, iron or vanadium derivative of cellulose.

5. A water insoluble derivative of streptomycin chemically coupled to a titanium, tin, zirconium, iron, or vanadium derivative of cellulose.

6. A water insoluble derivative of paromomycin chemically coupled to a titanium, tin, zirconium, iron or vanadium derivative of cellulose.

7. A water insoluble derivative of gentamycin chemically coupled to a titanium, tin, zirconium, iron or vanadium derivative of cellulose.

8. A water insoluble derivative of kanamycin chemically coupled to a titanium, tin, zirconium, iron or vanadium derivative of cellulose.

9. A water insoluble derivative of neomycin chemically coupled to a titanium, tin, zirconium, iron or vanadium derivative of cellulose.

10. A water insoluble derivative of polymyxin chemically coupled to a titanium, tin, zirconium, iron or vanadium derivative of cellulose.

11. A water insoluble derivative of ampicillin chemically coupled to a titanium, tin, zirconium, iron or vanadium derivative of cellulose.

12. A water insoluble derivative of natamycin chemically coupled to a titanium, tin, zirconium, iron or vanadium derivative of cellulose.

* * * * *